US010739806B2

United States Patent
Laschinski et al.

(10) Patent No.: US 10,739,806 B2
(45) Date of Patent: Aug. 11, 2020

(54) METHOD FOR DETERMINING A MAXIMUM POSSIBLE POWER OF A PV INSTALLATION, AND PV INSTALLATION

(71) Applicant: SMA Solar Technology AG, Niestetal (DE)

(72) Inventors: Joachim Laschinski, Kassel (DE); Gerd Bettenwort, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 16/527,449

(22) Filed: Jul. 31, 2019

(65) Prior Publication Data
US 2019/0354129 A1 Nov. 21, 2019

Related U.S. Application Data

(63) Continuation of application No. PCT/EP2018/053226, filed on Feb. 8, 2018.

(30) Foreign Application Priority Data

Feb. 13, 2017 (DE) .................. 10 2017 102 771

(51) Int. Cl.
*G05F 1/67* (2006.01)
*H02S 40/36* (2014.01)
(Continued)

(52) U.S. Cl.
CPC ............... *G05F 1/67* (2013.01); *H02J 3/383* (2013.01); *H02S 40/36* (2014.12); *H02S 50/10* (2014.12); *H02J 2300/24* (2020.01)

(58) Field of Classification Search
CPC ... G05F 1/67; H02J 3/382; H02J 3/383; H02J 3/385; H02J 2300/24; H02S 40/36; H02S 50/10
See application file for complete search history.

(56) References Cited

U.S. PATENT DOCUMENTS

2009/0315404 A1* 12/2009 Cramer .................. H02J 3/383
307/82
2010/0231045 A1* 9/2010 Collins ..................... H02J 7/35
307/47
(Continued)

FOREIGN PATENT DOCUMENTS

DE 102010038941 A1 2/2012
DE 102012218366 B3 2/2014

OTHER PUBLICATIONS

Esram, Trishan et al; "Comparison of Photovoltaic Array Maximum Power Point Tracking Techniques"; IEEE Transactions on Energy Conversion; vol. 23, No. 2; Jun. 2007.

*Primary Examiner* — Yusef A Ahmed
(74) *Attorney, Agent, or Firm* — Eschweiler & Potashnik, LLC

(57) ABSTRACT

A method for determining a currently maximum possible power of a photovoltaic (PV) installation operated in a curtailed manner and including a PV generator having at least one string, wherein the at least one string includes a series circuit of PV modules, in which at least one PV module is connected to adjacent PV modules in the string via a coupling circuit. The installation further includes an inverter which is connected, on the output side, to an energy supply grid and is connected, on the input side, to the PV generator. The installation also includes a controller for controlling the inverter and the coupling circuit, wherein the controller, in conjunction with the coupling circuit, is designed to vary a power drain of the PV module assigned to it relative to a power drain of the adjacent PV modules during operation of the PV installation.

15 Claims, 6 Drawing Sheets

(51) Int. Cl.
*H02S 50/10* (2014.01)
*H02J 3/38* (2006.01)

(56) References Cited

U.S. PATENT DOCUMENTS

| | | | | |
|---|---|---|---|---|
| 2010/0289337 | A1* | 11/2010 | Stauth | H02J 3/385 |
| | | | | 307/77 |
| 2011/0156484 | A1* | 6/2011 | Chiang | G05F 1/67 |
| | | | | 307/71 |
| 2011/0196543 | A1* | 8/2011 | Gonz Lez Senosiain | |
| | | | | G05F 1/67 |
| | | | | 700/287 |
| 2011/0198935 | A1* | 8/2011 | Hinman | H02H 7/1222 |
| | | | | 307/80 |
| 2011/0273015 | A1* | 11/2011 | Adest | H01L 31/02021 |
| | | | | 307/43 |
| 2011/0285375 | A1* | 11/2011 | Deboy | G05F 1/67 |
| | | | | 323/299 |
| 2011/0298292 | A1* | 12/2011 | Bremicker | H01L 31/02021 |
| | | | | 307/82 |
| 2012/0049637 | A1* | 3/2012 | Teichmann | H02J 3/26 |
| | | | | 307/82 |
| 2012/0319489 | A1* | 12/2012 | McCaslin | H02J 1/10 |
| | | | | 307/77 |
| 2013/0027020 | A1* | 1/2013 | Klein | G05F 1/67 |
| | | | | 324/103 R |
| 2013/0058140 | A1* | 3/2013 | Victor | H01L 31/02021 |
| | | | | 363/56.01 |
| 2013/0147275 | A1* | 6/2013 | Bettenwort | H02J 3/383 |
| | | | | 307/43 |
| 2013/0221753 | A1* | 8/2013 | Perreault | G05F 1/571 |
| | | | | 307/77 |
| 2013/0320778 | A1* | 12/2013 | Hopf | H01L 31/02021 |
| | | | | 307/130 |
| 2013/0328403 | A1* | 12/2013 | Kaufman | H02J 3/385 |
| | | | | 307/77 |
| 2014/0204613 | A1* | 7/2014 | Blanz | H02J 3/32 |
| | | | | 363/13 |
| 2016/0018456 | A1* | 1/2016 | Yilmaz | H02S 50/10 |
| | | | | 324/761.01 |
| 2016/0072292 | A1* | 3/2016 | Rogers | H02J 3/383 |
| | | | | 307/62 |
| 2016/0105146 | A1 | 4/2016 | Ammirata | |
| 2016/0254672 | A1* | 9/2016 | Yoscovich | H02M 3/04 |
| | | | | 307/77 |
| 2017/0025993 | A1* | 1/2017 | Kang | H02S 30/10 |
| 2018/0152131 | A1* | 5/2018 | Vidhi | F03D 9/255 |
| 2018/0329382 | A1* | 11/2018 | Somani | H02J 3/385 |
| 2018/0351015 | A1* | 12/2018 | Hopf | H01L 31/02021 |
| 2019/0273382 | A1* | 9/2019 | Zhang | H02J 3/32 |

* cited by examiner

METHOD FOR DETERMINING A MAXIMUM POSSIBLE POWER OF A PV INSTALLATION, AND PV INSTALLATION

CROSS REFERENCE TO RELATED APPLICATIONS

This application is a continuation of International Patent Application number PCT/EP2018/053226, filed on Feb. 8, 2018, which claims priority to German Patent Application number 10 2017 102 771.8, filed on Feb. 13, 2017, and is hereby incorporated by reference in its entirety.

FIELD

The disclosure relates to a method for determining a maximum possible power Pmax of a photovoltaic (PV) installation operated in a curtailed manner.

BACKGROUND

In order to be able to comply with requests to operate a PV installation in a curtailed manner, it is necessary to know and track the maximum possible power Pmax of the PV installation at any time, even in the curtailed state of the PV installation, in order to be able to also readjust the power fed into the energy supply grid by the PV installation in the event of a change in the maximum possible power.

Separate radiation sensors are usually used to determine a maximum possible power Pmax of a PV installation. The radiation sensors are PV cells which provide a measurement signal proportional to currently prevailing radiation. If a PV installation is provided with one or more radiation sensors and if the sensors are arranged in such a manner that they representatively capture the radiation of the PV modules of the PV generator, the maximum possible power Pmax of the PV installation can be inferred from the measurement signals from the sensors. However, the radiation sensors are separate components which should be kept available in the PV installation in addition to the PV modules. In addition, the cell types of the radiation sensor and of the PV module generally differ. In addition, the PV cells of the radiation sensor and of the PV module may also be embedded differently. In this case, the embedding of the PV cells characterizes the manner in which the PV cells are installed in their respective housing. These differences cause, in principle, a different electrical and thermal reaction of the PV cells to particular radiation. They therefore require calibration of the sensor measurement signals with respect to the PV modules used, as well as regular calibration checks, which makes this method expensive, in particular for smaller PV installations.

The document US 2011/0196543 A1 discloses a method for determining a maximum possible power of a PV installation operated in a curtailed manner. In this case, the PV installation has at least two installation parts which can be controlled separately. In this case, a first installation part is operated without limiting the maximum possible power. In one embodiment of a method described there, the maximum power of the overall PV installation is estimated with the aid of the power of the first installation part. A second installation part is operated in a curtailed manner in such a way that the PV installation satisfies a predefined curtailment requirement. However, in this case, it is necessary to always operate certain installation parts without restricting their power, which is disadvantageous, at least in the case of overall strong curtailment of the PV installation.

Furthermore, the document DE 10 2010 038 941 A1 discloses a method for determining the maximum possible power of a PV installation with one or more inverters, which is operated in a curtailed manner when averaged over a period. In this case, the inverter(s) of the PV installation is/are operated differently in the period. A maximum possible feed-in amount—and therefore a maximum possible power of the PV installation averaged over the period—is determined from the different operating data relating to the inverter(s). However, a temporal fluctuation in the power fed in by the desired value of the reduced power is tolerated within the period.

The document US 2016/0105146 A1 discloses a method for measuring the maximum power which is available from a photovoltaic array without connected AC devices having to consume power at the time of the measurement. In the method, a power converter connected to the PV array is deactivated for short periods at defined intervals. During these periods, an open-circuit voltage is measured, on the one hand, as soon as it is reached. On the other hand, the PV array is short-circuited via a resistor, in which case a short-circuit current is measured. The measurements are transmitted to a central control circuit for calculating the maximum power.

The article "Comparison of Photovoltaic Array Maximum Power Point Tracking Techniques", IEEE TRANSACTIONS ON ENERGY CONVERSION, VOL. 22, JUNE 2007, NO. 2, 439-449, discloses various MPP tracking methods. Whereas an MPP voltage is linked to an open-circuit voltage via a constant in one method, another method discloses the practice of linking an MPP current to a short-circuit current via a further constant.

SUMMARY

The disclosure includes a method for determining a maximum possible power Pmax of a PV installation operated in a curtailed manner, that is to say with reduced power, said method having the smallest possible fluctuation in a power fed in by the desired value of the reduced power and simultaneously allowing the greatest possible curtailment of the PV installation. In this case, the method is intended to be able to be implemented as easily and cost-effectively as possible. The disclosure includes a PV installation employing such a method.

In a method according to the disclosure for determining a currently maximum possible power Pmax of a photovoltaic (PV) installation operated in a curtailed manner, the PV installation comprises a PV generator having at least one string. In this case, the at least one string comprises a series circuit of PV modules, in which at least one PV module is connected to adjacent PV modules in the string via a coupling circuit. The PV installation also comprises an inverter which is connected, on the output side, to an energy supply grid and is connected, on the input side, to the PV generator, and a controller for controlling the inverter and the coupling circuit. In this case, the controller, in conjunction with the coupling circuit, is designed to vary a power drain of the PV module assigned to it relative to a power drain of the adjacent PV modules during operation of the PV installation. The method comprises the acts of:

determining reference values for the PV module assigned to the coupling circuit, comprising a reference MPP power $P_{MPP,Ref}$ and at least one value, from a reference current $I_{SC,Ref}$ close to short circuit and/or a reference voltage $U_{0,Ref}$ close to open circuit, that is assigned to the reference MPP power $P_{MPP,Ref}$, operating the PV installation, in response to a curtailment signal, in a curtailed state with a lower power P than the currently maximum possible power of the PV installation. The method further comprises for the PV module assigned to the coupling circuit in the curtailed state of the PV installation, determining a second current value $I_{SC,2}$ indicating an operating mode close to short circuit, and/or determining a second voltage value $U_{0,2}$ indicating an operating mode close to open circuit, and determining the currently maximum possible power Pmax in the curtailed state of the PV installation from the second current value $I_{SC,2}$, the reference current $I_{SC,Ref}$ close to short circuit and the reference MPP power $P_{MPP,Ref}$, or the second voltage value $U_{0,2}$, the reference voltage $U_{0,Ref}$ close to open circuit and the reference MPP power $P_{MPP,Ref}$, or a combination of the second current value $I_{SC,2}$, the reference current $I_{SC,Ref}$ close to short circuit, the second voltage value $U_{0,2}$, the reference voltage $U_{0,Ref}$ close to open circuit and the reference MPP power $P_{MPP,Ref}$.

In one embodiment a value of the reference current $I_{SC,Ref}$ close to short circuit or of the reference voltage $U_{0,Ref}$ close to open circuit is assigned to the reference MPP power $P_{MPP,Ref}$ when the values are determined so close to one another in terms of time that a change in the radiation on or in a temperature of the PV module can be disregarded for the duration of the different measurements, in other words when a current/voltage (I/U) characteristic curve of the PV module therefore has not—at least not significantly—changed during the determination of the reference values.

According to one embodiment of the disclosure, the PV module connected to the string via the coupling circuit is used as a sensor for determining the maximum possible power Pmax of the PV generator or of the PV installation. In this case, the affected PV module is changed to its maximum power point (MPP) for the purpose of determining the reference values—and possibly only briefly there. This can, but need not, be carried out during the curtailed operation of the PV installation. Briefly in the sense of the disclosure should be understood as meaning a period which is sufficiently long to determine a current and/or voltage value indicating the respective operating mode. This period is usually shorter than a residence time at a particular voltage of the PV generator during a step within an MPP tracking method. In particular, in one example, briefly should be understood as meaning a period which is shorter than 5 seconds, and in one particular example less than 1 second.

In contrast, the further measurements—for example the determination of the second current value $I_{SC,2}$ and/or of the second voltage value $U_{0,2}$—are carried out in the operating mode close to short circuit and/or the operating mode close to open circuit of the PV module and are therefore associated with a small power drain of the PV module. If necessary, the PV module can even be disconnected from the adjacent PV modules in the string via the coupling circuit during these measurements, with the result that virtually no power is drained from the PV module and is output to the string. Therefore, it is not necessary to operate a part of the PV installation at the MPP in the curtailed state and, on account of this, it is also possible to curtail the PV installation to an extreme extent. In this case, even in the highly curtailed state, the maximum possible power Pmax of the PV installation can always be easily determined. If only one PV module of the PV generator is connected to adjacent PV modules in the at least one string via a coupling circuit, the maximum possible power Pmax can be calculated on the basis of one of the following equations $$P_{max} = N \frac{I_{SC,2}}{I_{SC,Ref}} P_{MPP,Ref} \quad \text{(Eq. 1a)}$$

$$P_{max} = N \frac{U_{0,2}}{U_{0,Ref}} P_{MPP,Ref} \quad \text{(Eq. 1b)}$$

$$P_{max} = N \frac{I_{SC,2}}{I_{SC,Ref}} \frac{U_{0,2}}{U_{0,Ref}} P_{MPP,Ref} \quad \text{(Eq. 1c)}$$

depending on whether the determination is carried out taking into account the second current value $I_{SC,2}$ (Eq. 1a), the second voltage value $U_{0,2}$ (Eq. 1b) or a combination of the second current value $I_{SC,2}$ and the second voltage value $U_{0,2}$ (Eq. 1c). The determination of the maximum possible power Pmax according to one of the equations (Eq. 1a-Eq. 1c) is respectively an estimation of the maximum possible power Pmax which, depending on which of the equations (Eq. 1a-Eq. 1c) is used, can provide slightly different values for the maximum possible power Pmax. In this case, N denotes the number of PV modules inside the PV generator. If a plurality of PV modules are provided in the PV generator via coupling circuits and are each considered to be representative of a number ni of PV modules N present overall, the maximum possible power Pmax of the PV installation results from—possibly weighted—averaging of the different measurements. In this case, the weighting of an individual measurement i is oriented to how many PV modules ni are represented by this measurement or to the ratio ni/N.

Generally, a determination according to equation Eq. 1c is closer to the actual value of the maximum possible power than a determination according to one of equations Eq. 1a and Eq. 1b since, according to Eq. 1c, both a radiation dependence and a temperature dependence are taken into account independently of one another. However, use of equation Eq. 1a or Eq. 1b may nevertheless be advantageous if, for example, a PV installation allows only one of the two operating modes of the PV module assigned to it, comprising the operating mode close to short circuit and the operating mode close to open circuit, on account of the design, for example on account of a simple coupling circuit. However, this usually requires the reference values—in comparison with an estimation of the maximum possible power PMPP using equation Eq. 1c and depending on the required accuracy—to be determined at shorter intervals of time. Nevertheless, as explained below, a possible temperature change in the PV module or its PV cells can at least also be taken into account in the estimation. In equation Eq. 1c, the ratio of the second current value close to short circuit to the reference current value according to $I_{SC,2}/I_{SC,Ref}$ indicates the influence of a radiation change $\Delta E_{Einstr}$ on the maximum possible power Pmax, whereas the ratio of the second voltage value close to open circuit to the reference voltage according to $U_{0,2}/U_{0,Ref}$ characterizes the influence of a temperature change in the PV module or its PV cells. Equation Eq. 1c can therefore also be represented in the form $$P_{max} = N * \frac{I_{SC,2}}{I_{SC,Ref}} * f(\Delta T_{Umg}, \Delta E_{Eins}, \Delta t) * P_{MPP,Ref}, \quad \text{(Eq. 2)}$$

wherein the influence of the temperature change in the PV module or its PV cells is combined in one function f=f ($\Delta T_{Umg}$, $\Delta E_{Einstr}$, $\Delta t$). However, in this case, a temperature change in the PV cells cannot only be effected by a change in the ambient temperature $\Delta T_{Umg}$ but also via a change in the radiation $\Delta E_{Einstr}$. For example, an increase in the radiation results in an increase in the temperature of the PV cells, whereas a reduction in the radiation results in a decrease in the temperature of the PV cells. On account of the linear relationship between radiation and the short-circuit current via the second current value $I_{SC,2}$ or the ratio of the second current value and the reference current assigned to it according to $I_{SC,2}/I_{SC,Ref}$, a radiation-induced temperature change in the PV cells is monitored, in principle, however, during the method by determining the second current value $I_{SC,2}$.

However, the various mechanisms which result in a temperature change in the PV cells have very different time constants. A change in the ambient temperature $\Delta T_{Umg}$—and therefore also its influence on the temperature change in the PV cell—takes place relatively slowly and therefore has a large time constant (for example in the region of a few hours). The environment-induced temperature change in the PV cells can be taken into account in the method according to the disclosure according to equation Eq. 1a by means of an accordingly adapted repetition rate of the reference measurements, with the result that a change in the ambient temperature $\Delta T_{Umg}$ relative to the last reference measurement can be excluded or at least disregarded. In contrast, radiation energy is directly introduced into the PV cell via the sunlight, with the result that a radiation change $\Delta E_{Einstr}$ results in a comparatively fast temperature change in the PV cells. Nevertheless, the temperature of the PV cells reacts to the radiation change $\Delta E_{Einstr}$ with a certain inertia. In other words: a radiation change $\Delta E_{Einstr}$ must first be present for a certain time until a new equilibrium temperature of the PV cell has been established again, which is taken into account by means of the explicit dependence of the function f on the time $\Delta t$. However, the second current value $I_{SC,2}$ itself or its ratio to the last determined reference current $I_{SC,Ref}$ can be used as a trigger which indicates when it is necessary to again determine the reference current $I_{SC,2}$ close to short circuit. In this case, two different variants can be used when estimating the maximum possible power Pmax according to equation Eq. 1a:

1) In the first case, a maximum tolerable change in the second current value $I_{SC,2}$ relative to the last determined reference current $I_{SC,Ref}$ is predefined. In this case, it is necessary to again determine the reference current when the detected second current value $I_{SC,2}$ close to short circuit is outside the predefined tolerance range by the last determined reference current $I_{SC,Ref}$. In contrast, if it is within the predefined tolerance range, a renewed reference measurement is not required. Even a short-circuit current $I_{SC,2}$ applied for a relatively long time in this case results in a change in the cell temperature which can still be considered to be tolerable.
2) In the second case, a sliding average of the second current value $I_{SC,2}$ (or of the ratio $I_{SC,2}/I_{SC,Ref}$) is formed retrospectively over a certain period. A new reference measurement is required only when the sliding average of the second current value $I_{SC,2}$ (or of the ratio $I_{SC,2}/I_{SC,Ref}$) is outside a predefined tolerance range by the reference current value $I_{SC,Ref}$ (or by the ratio desired value 1.00). In this case, the period is advantageously selected in such a manner that it takes into account an inertia period of the PV cells and corresponds, for example, to the time needed by the PV cells to approach a new equilibrium temperature in the event of a sudden radiation change (possibly up to a predefined temperature difference).

Since the power drain for determining the second current value $I_{SC,2}$ and/or the second voltage value $U_{0,2}$ is itself low and is also effected only at one PV module or at individual PV modules of the PV generator, a temporal fluctuation of the power of the PV installation is likewise low and can even disappear entirely if the PV module is disconnected during the determination. The PV module assigned to the coupling circuit is usually of the same type and also has the same embedding of the PV cells as the remaining PV modules of the PV generator. Therefore, it also behaves like the remaining PV modules under the same environmental conditions and, in particular, also ages in the same manner. Therefore, there is no need for both initial calibration operations and regular recalibration operations, as would be necessary when using radiation sensors to determine a maximum possible power Pmax of the PV installation. The costs of purchasing separate radiation sensors are likewise unnecessary since their function is assumed by the at least one PV module, which is present anyway, in conjunction with the coupling circuit. In this case, the coupling circuit can be relatively cost-effective, in particular when it is designed as an enabling circuit of the PV module, with the result that a cost advantage still results overall. This is the case, in particular, when corresponding enabling circuits are required anyway for PV modules, for example on account of separate provisions for PV installations. If the PV modules of the PV generator are oriented in the same manner and are subjected to the same environmental conditions, it is sufficient to connect only one PV module to the remaining PV modules in the string via a coupling circuit. However, in the case of inhomogeneous environmental conditions inside the PV generator or a different orientation of the PV modules, it is advisable to provide a plurality of PV modules having coupling circuits and to representatively distribute them inside the PV generator.

In one embodiment, the reference values are generated by scanning the I/U characteristic curve—i.e. a so-called characteristic curve sweep of the I/U characteristic curve—or by sequentially, at least briefly changing the PV module assigned to the coupling circuit to the corresponding operating modes comprising the operating mode close to short circuit, the operating mode close to open circuit and the MPP operating mode. The same therefore also applies to the determination of the second current value $I_{SC,2}$ and the second voltage value $U_{0,2}$. Alternatively, the PV module can also be operated for a relatively long period in the corresponding operating modes or the corresponding operating mode for the purpose of determining the second current value $I_{SC,2}$ and/or the second voltage value $U_{0,2}$. In one advantageous embodiment of the method, the PV module assigned to the coupling circuit is permanently operated in the respective operating mode comprising the operating mode close to short circuit and the operating mode close to open circuit, and there is optionally only a brief change to the respective other operating mode comprising the operating mode close to open circuit and the operating mode close to short circuit.

In one advantageous embodiment of the method, a current of the adjacent PV modules is guided past the PV module assigned to the coupling circuit via a bypass path of the coupling circuit when determining the reference voltage $U_{0,Ref}$ close to open circuit and/or the second voltage value $U_{0,2}$. Such a bypass path can be formed, for example, via a diode or a controllable semiconductor switch of the coupling circuit which is connected in parallel with output connections of the coupling circuit. When the PV module is changed to the operating mode close to open circuit or is disconnected from the adjacent PV modules in the string, this prevents the current in the string from also being necessarily reduced.

In one variant of the method, for the PV module assigned to the coupling circuit in the curtailed state of the PV installation, second current values $I_{SC,2}$ indicating the operating mode close to short circuit and/or second voltage values $U_{0,2}$ indicating the operating mode close to open circuit are determined repeatedly and at successive times. In this case, the currently maximum possible power Pmax is determined from the respectively last determined variables comprising the second current value $I_{SC,2}$ and/or the second voltage value $U_{0,2}$. The last determined reference values comprising the reference MPP power $P_{MPP,Ref}$, the reference current $I_{SC,Ref}$ close to short circuit and/or the reference voltage $U_{0,Ref}$ close to open circuit are advantageously also each taken into account in the determination. In this manner, a temporal change in the maximum possible power Pmax of the PV installation is tracked in the curtailed state.

In one embodiment of the method, at least one switch arranged inside a connecting line of the coupling circuit is permanently open when determining the second current value $I_{SC,2}$ and/or the second voltage value $U_{0,2}$. The PV module can be disconnected from the adjacent PV modules in the string via the permanently open switch arranged inside the connecting line. It is therefore possible to change from an operating mode close to short circuit to the operating mode close to open circuit of the PV module, and in the other direction, when the PV module is disconnected and therefore without a power change of the PV generator caused thereby. A current flowing in the string and driven through the adjacent PV modules can flow past the PV module in this case via the bypass path of the coupling circuit.

In principle, the reference values can also be determined in the curtailed state of the PV installation. However, the reference values for the PV module assigned to the coupling circuit are advantageously determined when the PV installation is also operated at maximum power Pmax. In the curtailed state of the PV installation, this prevents individual parts of the PV installation from being changed to the MPP state, albeit only briefly. In this case, in one embodiment, the reference values for the PV module assigned to the coupling circuit are determined with activated MPP tracking of the string. The determination is therefore associated with a change in the voltage of the string. Alternatively, however, the MPP tracking of the PV generator—which is carried out via the inverter for example—can also be deactivated when determining the reference values. In this case, there is a change to the operating mode close to short circuit and/or to the operating mode close to open circuit without changing the voltage of the string.

In order to be able to curtail the PV installation as quickly as possible on request and to also be able to subject it to upward regulation again, a large part of the PV generator is advantageously curtailed in the direction of the open circuit since a gradient of the power/voltage (P/U) characteristic curve is greater there than in the region of the P/U characteristic curve close to short circuit. Therefore, the PV installation can react more quickly and with a greater dynamic response to a request to change the power which is fed in. In the curtailed state of the PV installation, those PV modules in the string which are not assigned a coupling circuit are therefore operated in a curtailed manner in the open-circuit direction. In contrast to this, it is advantageous to change the PV module assigned to the coupling circuit to the operating mode close to short circuit, at least for the majority of the time. In principle, however, it is also possible to curtail the PV generator in the short-circuit direction, in the case of which the PV module assigned to the coupling circuit is then advantageously operated in the operating mode close to open circuit, at least for the majority of the time.

A photovoltaic (PV) installation according to the disclosure comprises:
  a photovoltaic (PV) generator having at least one string which comprises a series circuit of PV modules and in which at least one PV module is connected to adjacent PV modules in the string via a coupling circuit,
  an inverter which is connected, on the input side, to the PV generator and is connected, on the output side, to an energy supply grid, and
  a controller configured to control the inverter and the coupling circuit. In this case, the PV installation—in particular its controller—is configured to carry out the method according to the disclosure.

The controller of the PV installation may be an individual central controller, but may also have a plurality of control circuits which are operationally connected to one another, one control circuit of which acts as a superordinate controller. In this case, the control circuits can be assigned to different components of the PV installation and may also be located inside the latter. For example, one control circuit may be arranged in the coupling circuit, another, superordinate control circuit may be arranged in the inverter or—if the PV installation has a plurality of inverters—in one of a plurality of inverters of the PV installation. The controller may have a separate evaluation circuit for evaluating the measurement and operating data. Alternatively, however, the controller may also itself operate as an evaluation circuit. The advantages already mentioned in connection with the method arise.

In one embodiment of the PV installation, the coupling circuit comprises
  two input connections configured to connect the PV module assigned to the coupling circuit,
  two output connections which are electrically connected to the input connections via connecting lines and configured to connect to the series circuit, and
  a current sensor configured to detect an input current $I_{ein}$ and/or a voltage sensor configured to detect an input voltage $U_{ein}$. Via the current and voltage sensors, the coupling circuit is able to determine the second current value $I_{SC,2}$ as the input current $I_{ein}$ and the second voltage value $U_{0,2}$ as the input voltage $U_{ein}$ at the PV module connected on the input side. For this purpose, the PV module is changed—at least briefly—to the respectively desired operating mode by the coupling circuit in conjunction with the controller beforehand or at the time of determining these variables. For this purpose, the coupling circuit of the PV installation advantageously has at least one switch which is arranged between the connecting lines, can be controlled via the controller and is intended to short-circuit the PV module connected to the coupling circuit. Alternatively or cumulatively, the coupling circuit has at least one switch which is arranged inside one of the connecting lines, can be controlled via the controller and is designed to connect an input connection to the output connection assigned to the latter or to disconnect them from one another. In principle, the switches can be formed by electromagnetic switches. However, they are advantageously formed by semiconductor switches, for example, by MOSFETs.

In one embodiment of the PV installation, the coupling circuit has a DC/DC converter, in particular a boost converter, a buck converter or a combined boost/buck converter. On account of an inductance of the DC/DC converter, the coupling circuit is therefore able to convert an input voltage $U_{ein}$ applied to the input connections into an output voltage $U_{aus}$ applied to the output connections by suitably controlling its switches. In this case, any desired conversion ratio $U_{aus}/U_{ein}$ of the output voltage to the input voltage can be set using a duty cycle of the clocking within certain limits. This enables finely graduated adjustment of the input voltage $U_{ein}$, as is required, for example, when carrying out a characteristic curve sweep of the I/U characteristic curve for the PV module assigned to the coupling circuit. In an alternative embodiment, the coupling circuit has a so-called enabling circuit for the PV module connected on the input side. In this case, there is no need for any DC/DC conversion with a conversion ratio which can be set as desired and therefore there is also no need for an inductance of the DC/DC converter. Rather, the coupling circuit, as an enabling circuit, is able, in particular, to short-circuit the PV module assigned to it by means of a low-impedance connection of the input connections to one another or is able to disconnect it from the adjacent PV modules by opening an otherwise closed connection between input connections and output connections of the coupling circuit. The enabling can therefore be carried out by means of disconnection and/or short-circuiting, which is why the coupling circuit designed as an enabling circuit can also accordingly change the PV module assigned to it to the operating mode close to short circuit and/or to the operating mode close to open circuit. However, the inductance assigned to the DC/DC converter is absent for a DC/DC conversion in the actual sense. An input and/or output capacitance is also not absolutely necessary for an enabling circuit. Therefore, the coupling circuit designed as an enabling circuit can also be produced in a particularly cost-effective manner. Irrespective of its design as a DC/DC converter or else as an enabling circuit, the coupling circuit may have a communication circuit. The coupling circuit can communicate measurement and operating data to a superordinate controller via the communication circuit. A control circuit assigned to the coupling circuit can likewise also receive commands and/or instructions from a superordinate controller, for example from a superordinate controller arranged in an inverter. Examples of a coupling circuit configured as an enabling circuit are explained in FIGS. 3a and 3b, whereas FIGS. 4a and 4b illustrate variants of a coupling circuit designed as a DC/DC converter.

BRIEF DESCRIPTION OF THE FIGURES

The disclosure is described and explained further below on the basis of preferred exemplary embodiments illustrated in the figures.

DETAILED DESCRIPTION

A PV installation operated in a curtailed manner is used to mean, in particular, a PV installation which is connected to an energy supply grid and the power of which is limited, for example on account of an explicit request from the energy supplier or on account of a frequency of the AC voltage above the nominal frequency in the energy supply grid. In this case, the PV installation can feed only some of its maximum possible power Pmax into the energy supply grid. In the case of such a request, it may be the case that the permitted power is defined as a fraction of the maximum possible power Pmax. For example, the PV installation is intended to be curtailed to 70% of its currently maximum possible power Pmax, wherein this request should be tracked over time. Alternatively, there may also be a requirement for the PV installation to hold a defined controlling power of, for example, 40% relative to its currently maximum possible power Pmax.

Figure 1:
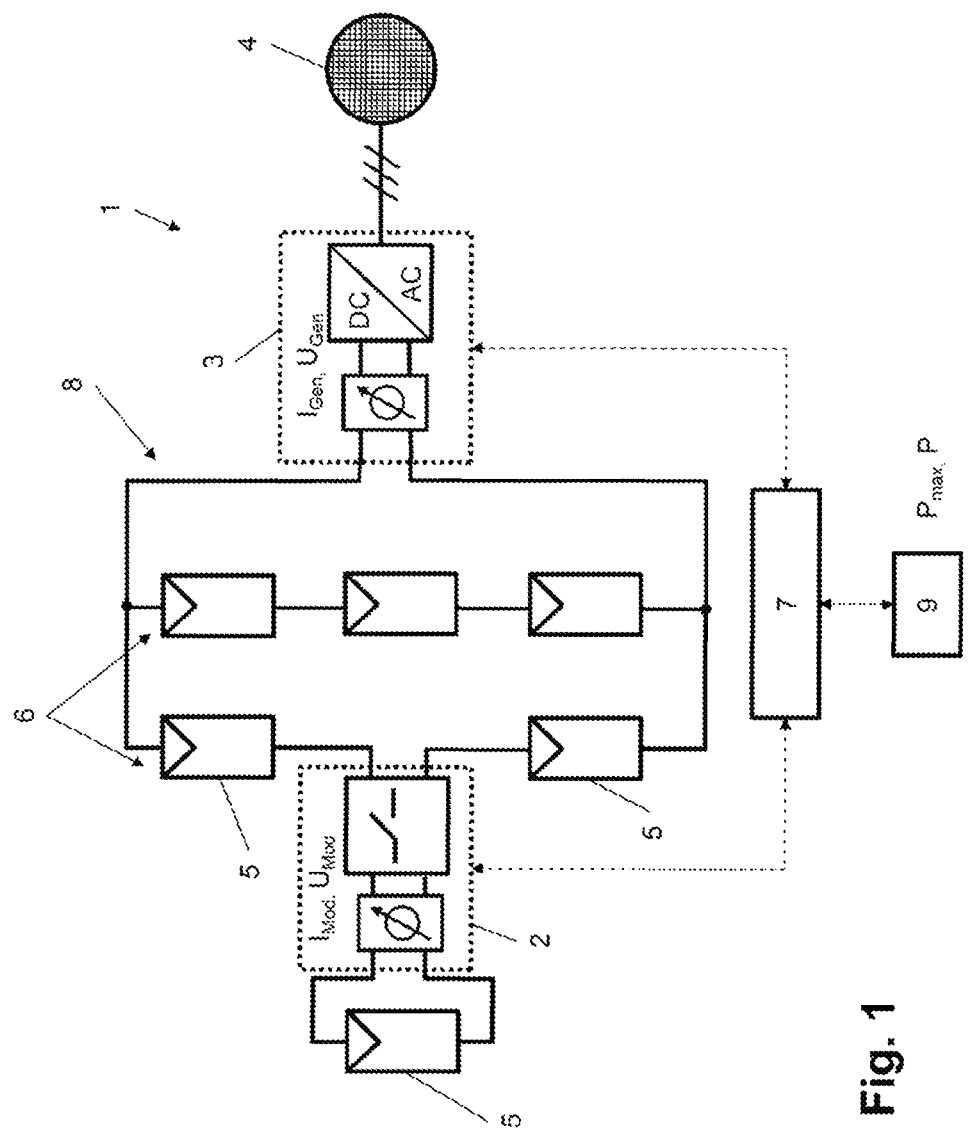
FIG. 1 shows an embodiment of a photovoltaic (PV) installation according to the disclosure for carrying out the method according to the disclosure.

FIG. 1 illustrates an embodiment of a photovoltaic (PV) installation 1 for carrying out the method according to the disclosure. The PV installation 1 comprises a three-phase inverter 3 which is connected, on the output side, to an energy supply grid 4. A PV generator 8 in the form of two strings 6 connected in parallel with one another is connected to a DC input of the inverter 3. Each string 6 has a series circuit comprising a plurality of (here: by way of example three) PV modules 5. In a string 6, one of the PV modules 5 is connected to the adjacent PV modules 5 in the string 6 via a coupling circuit 2. Both the inverter 3 and the coupling circuit 2 are controlled via a central controller 7. The controller 7 is set up to determine measurement and operating data relating to the coupling circuit 2—for example current IMod, voltage $U_{Mod}$ of the assigned PV module 5—and relating to the inverter 3—for example current IGen, voltage $U_{Gen}$ of the PV generator 8—using suitable sensors of the inverter 3 and of the coupling circuit 2 (each schematically illustrated in FIG. 1 using a measuring device symbol). The measurement and operating data are analyzed and evaluated by an evaluation circuit 9 operationally connected to the controller 7. The controller 7 is also designed to control the operation of the coupling circuit 2 and of the inverter 3 on the basis of the evaluated measurement and operating data. The operational and possibly communicative connection between the controller 7 and the coupling circuit 2, the inverter 3 and the evaluation circuit 9 is schematically illustrated in FIG. 1 by the dashed lines.

During operation of the PV installation 1, the controller 7 determines the current $I_{Gen}$ and voltage $U_{Gen}$ of the PV generator 8 as measurement and operating data relating to the inverter 3 at successive times. The controller 7 additionally determines the current $I_{Mod}$ and voltage $U_{Mod}$ as corresponding electrical measurement and operating data relating to the selected PV module 5 which is connected to the adjacent PV modules 5 in the string 6 via the coupling circuit 2. The evaluation circuit 9 connected to the controller 7 calculates therefrom an electrical power $P_{Gen}=I_{Gen}*U_{Gen}$ which is drained from the PV generator 8 and, apart from conversion losses in the inverter 3, corresponds to the electrical power P of the PV installation 1 which is fed into the energy supply grid 4. In a corresponding manner, an electrical power $P_{Mod}$ which is drained from the PV module 5 is calculated from the measurement and operating data $I_{Mod}$, $U_{Mod}$ relating to the PV module 5 according to $P_{Mod}=U_{Mod}*I_{Mod}$. At certain times, the PV module 5 connected to the coupling circuit 2 is changed, at least briefly, via the controller 7 to an operating mode close to short circuit and/or to an operating mode close to open circuit, in which a second current value $I_{SC,2}$ indicating the operating mode close to short circuit and a second voltage value $U_{0,2}$ indicating the operating mode close to open circuit are determined by the controller 7 as measurement and operating data relating to the PV module 5 assigned to the coupling circuit 2. The evaluation circuit 9 determines a maximum possible power of the PV module 5—and, via the latter, a maximum possible power Pmax of the PV generator 8 or of the PV installation 1—in the curtailed state of the PV installation 1 via the second current value $I_{SC,2}$ and/or the second voltage value $U_{0,2}$ in conjunction with previously determined reference values of the PV module 5 and transmits said power to the controller 7. The controller 7 readjusts, if necessary, a reduced electrical power P which is fed into the energy supply grid 4 taking into account the maximum possible power Pmax in order to curtail the PV installation 1 to a defined percentage of the maximum possible power Pmax. The method is explained in detail in connection with the flowchart in FIG. 2.

FIG. 1 illustrates, by way of example, a three-phase inverter 3. However, the PV installation 1 according to the disclosure may also have an inverter 3, the output of which is connected to the energy supply grid 4 using a different number of phase conductors, for example using only one phase conductor. The inverter 3 illustrated is a single-stage inverter. Alternatively, however, the inverter may also have a multistage design and may comprise, for example, a DC/DC converter connected upstream of the DC/AC converter. Furthermore, the PV installation 1 may alternatively also have a plurality of coupling circuits 2 which are each used to connect a PV module 5 to adjacent PV modules 5 in the corresponding string 6. The number of coupling circuits 2 depends on how homogeneously radiation is distributed over the entire PV generator 8.

Figure 2:
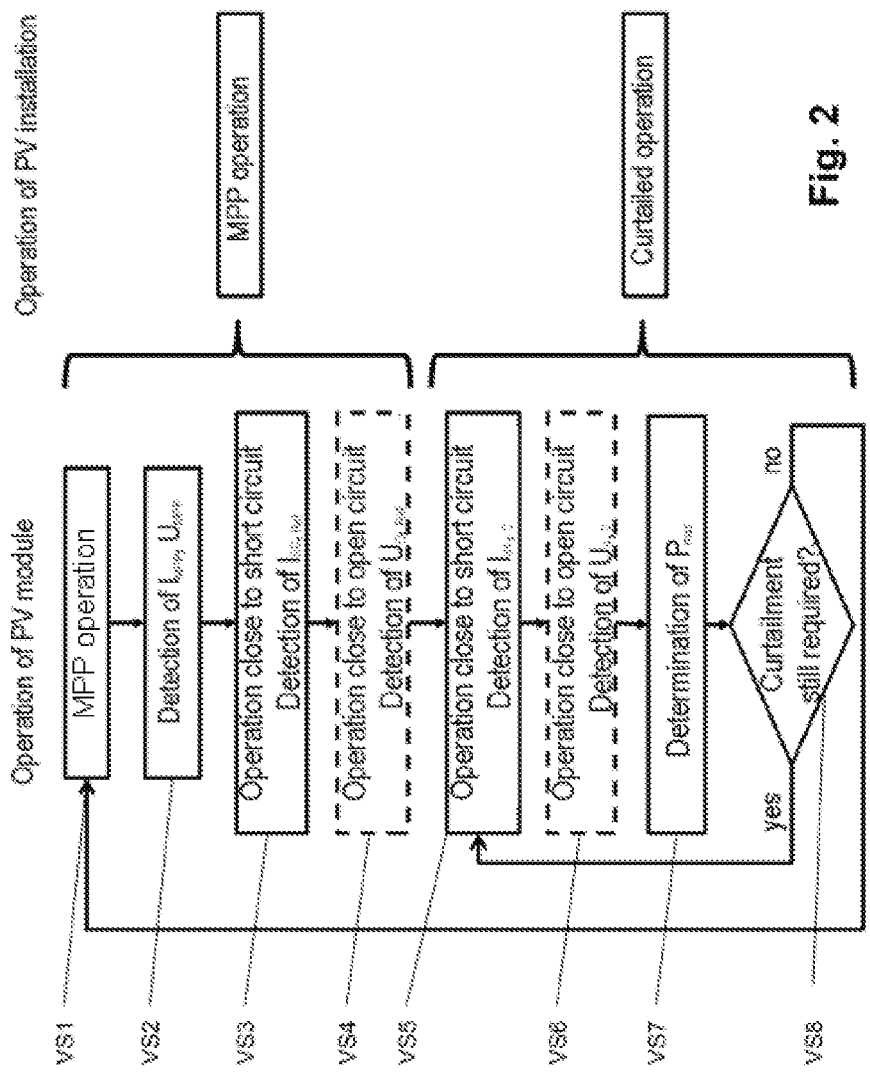
FIG. 2 shows a flowchart of the method according to the disclosure

FIG. 2 shows a flowchart of the method according to the disclosure using the example of the PV installation 1 from FIG. 1. In this case, the PV installation 1—apart from the PV module 5 assigned to the coupling circuit 2—is continuously in an MPP mode, in which a maximum possible power Pmax of the PV installation 1 is fed into the energy supply grid 4, during method acts VS1-VS4. The PV installation 1 is operated in a curtailed manner during acts VS5-VS8, for example on account of an external request. Here, only a power P of the PV installation 1 which is reduced in comparison with the maximum possible power Pmax is fed into the energy supply grid 4.

In a first act VS1, the PV module 5 assigned to the coupling circuit 2 is first of all changed, via the controller 7, to an MPP operating mode provided that it is not already in the MPP operating mode anyway. In a second act VS2, values of the current IMPP and voltage UMPP which characterize the MPP operating mode are determined and are used to calculate a reference MPP power $P_{MPP,Ref}$ of the PV module 5. Close to act VS2 in terms of time, the PV module 5 is, at least briefly, changed to an operating mode close to short circuit in an act VS3 and a reference current $I_{SC,Ref}$ close to short circuit which indicates this operating mode is determined. Close to the third act VS3 and to the second act VS2 in terms of time, an optional fourth act VS4 now likewise follows, in which the PV module 5 is changed, at least briefly, to an operating mode close to open circuit. There, the controller 7, in conjunction with the corresponding sensors in the coupling circuit 2, determines a reference voltage $U_{0,Ref}$ close to open circuit of the PV module 5. The reference values comprising the reference MPP power PMPP, the reference current $I_{SC,Ref}$ close to short circuit and the reference voltage $U_{0,Ref}$ close to open circuit of the PV module 5, which are determined in acts VS1-VS4, are stored in the controller 7 or in the evaluation circuit 9 for further use.

Between the fourth act VS4 and the fifth act VS5, the PV installation 1 is changed to a curtailed mode, for example as a result of a request from an energy supplier, the energy supply grid 4 of which is fed by the PV installation 1. In this case, the PV installation 1 is intended to feed only a defined percentage—for example 70% —of its maximum possible power Pmax into the energy supply grid 4. In order to determine the maximum possible power Pmax, the PV module 5 assigned to the coupling circuit 2 is changed in a fifth act VS5 at least briefly—but optionally also permanently over a certain period—to an operating mode close to short circuit, and a second current value $I_{SC,2}$ indicating this operating mode is determined there. In a sixth act VS6 closely following the fifth act VS5 in terms of time, a second voltage value $U_{0,2}$ close to open circuit is also optionally determined by changing the PV module 5 assigned to the coupling circuit 2 at least briefly—but optionally also permanently over a certain period—to an operating mode close to open circuit. Finally, a currently maximum possible power Pmax of the PV installation 1 is determined in a seventh act VS7 via the evaluation circuit 9 taking into account the second current value $I_{SC,2}$ and possibly the second voltage value $U_{0,2}$ as well as the reference values comprising the reference MPP power PMPP, the reference current $I_{SC,Ref}$ close to short circuit and the reference voltage $U_{0,Ref}$ close to open circuit, which are determined in acts VS1 to VS4. This value is used by the evaluation circuit 9 to determine a reduced power P of the PV installation 1, which is allowed to be fed into the energy supply grid 4, taking into account the curtailment request. The reduced power P and possibly also the maximum possible power Pmax are transmitted to the controller 7 which then controls the inverter 3 in such a manner that the last determined reduced power P of the PV installation 1 is fed into the energy supply grid 4. The next act VS8 checks whether curtailment of the PV installation 1 is also still required. If this is the case, the method jumps back to the fifth act VS5 in which—possibly after a short waiting time—the PV module 5 is again changed, at least briefly, to the operating mode close to short circuit in which a second current value $I_{SC,2}$ is then again determined. If there is no longer any request for curtailment in act VS8, the method jumps to act VS1 in which the PV installation 1 and the selected PV module 5 are changed to the MPP operating mode.

It is within the scope of one embodiment of the disclosure to continuously store the reference values and to compare the currently determined reference values with reference values which have already been previously determined. The comparison can be used to determine whether the relevant PV module 5 has changed, for example on account of potential-induced degradation which begins gradually or other damage. In such a case, the PV installation 1 can accordingly signal this to the operator.

Figure 3A:
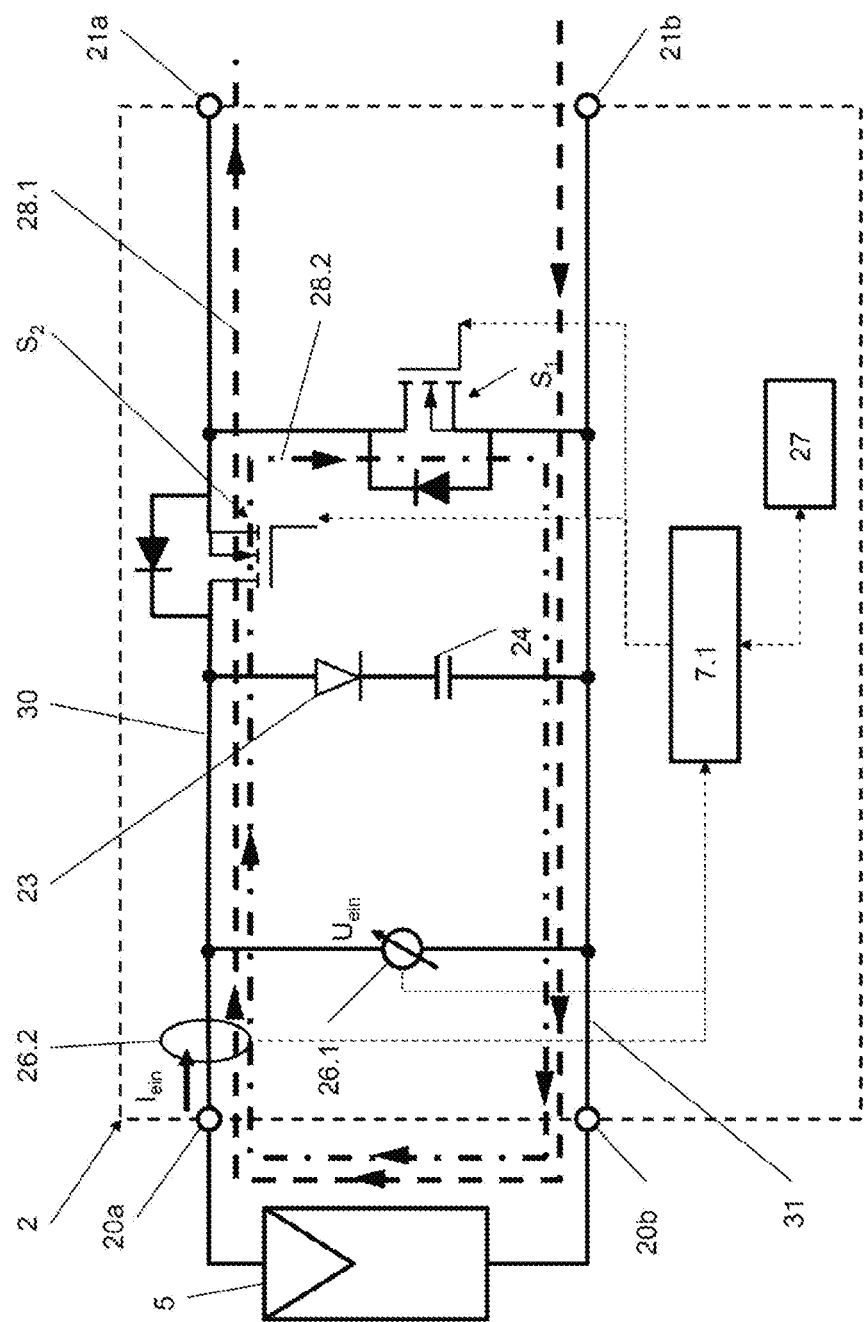
FIG. 3a shows a first embodiment of a coupling circuit for a photovoltaic (PV) module for carrying out the method

FIG. 3a illustrates a first embodiment of the coupling circuit 2 in the form of an enabling device for the assigned PV module 5. The coupling circuit 2 has an input having two input connections 20a, 20b for connecting the PV module 5 and an output having two output connections 21a, 21b for connecting the adjacent PV modules 5 in the string 6. Each of the input connections 20a, 20b is respectively connected to an output connection 21a, 21b assigned to it via a connecting line 30, 31. A second switch $S_2$—here a MOSFET—is arranged inside one of the connecting lines 30, 31 (here: the connecting line 30). A first switch $S_1$ is arranged in parallel with the output connections 21a, 21b and there connects the connecting lines 30, 31 to one another. Both switches are controlled via a control circuit 7.1. The control circuit 7.1 is connected to a voltage sensor 26.1 for capturing an input voltage $U_{ein}$ and to a current sensor 26.2 for capturing an input current $I_{ein}$, as illustrated using dashed lines in FIG. 3a. The control circuit 7.1 is also connected to a superordinate controller 7 (not illustrated here) of the PV installation 1 via a communication circuit 27. Both measurement and operating data relating to the coupling circuit 2 can be transmitted to the superordinate controller 7 and information and commands can be received from the superordinate controller 7 via the communication circuit 27. The coupling circuit 2 also has a series circuit comprising a diode 23 and an energy store 24 (here: a capacitor) which is arranged between the connecting lines 30, 31. In this case, the energy store 24 is used to supply the control circuit 7.1 and possibly further components of the coupling circuit 2.

During normal operation of the PV installation 1—for example in its MPP mode—the first switch $S_1$ is open and the second switch $S_2$ is closed. In this case, the power drained from the PV module 5 connected on the input side is transmitted to the output of the coupling circuit 2. Alternatively, however, the control circuit 7.1 of the coupling circuit 2 can change the assigned PV module 5 to an operating mode close to short circuit by closing the first switch $S_1$ and the second switch $S_2$ and can determine a second current value $I_{SC,2}$ indicating the operating mode close to short circuit as an input current $I_{ein}$ via the current sensor 26.2. The control circuit 7.1 is additionally able to change the PV module 5 to an operating mode close to open circuit when the first switch $S_1$ is closed and the second switch $S_2$ is open and to determine there a second voltage value $U_{0,2}$ indicating the operating mode close to open circuit as an input voltage $U_{ein}$ of the coupling circuit 2. As long as the PV module 5 is operated in the operating mode close to short circuit or in the operating mode close to open circuit via the coupling circuit 2, no power is transferred from the input to the output of the coupling circuit 2. Drawing of a usable power—for example a power which can be fed into the energy supply grid 4—of the PV module 5 is suppressed in these operating modes. In FIG. 3a, current paths 28.1, 28.2 inside the coupling circuit 2 for normal operation (28.1) and for the operating mode close to short circuit (28.2) are illustrated using different types of line.

Figure 3B:
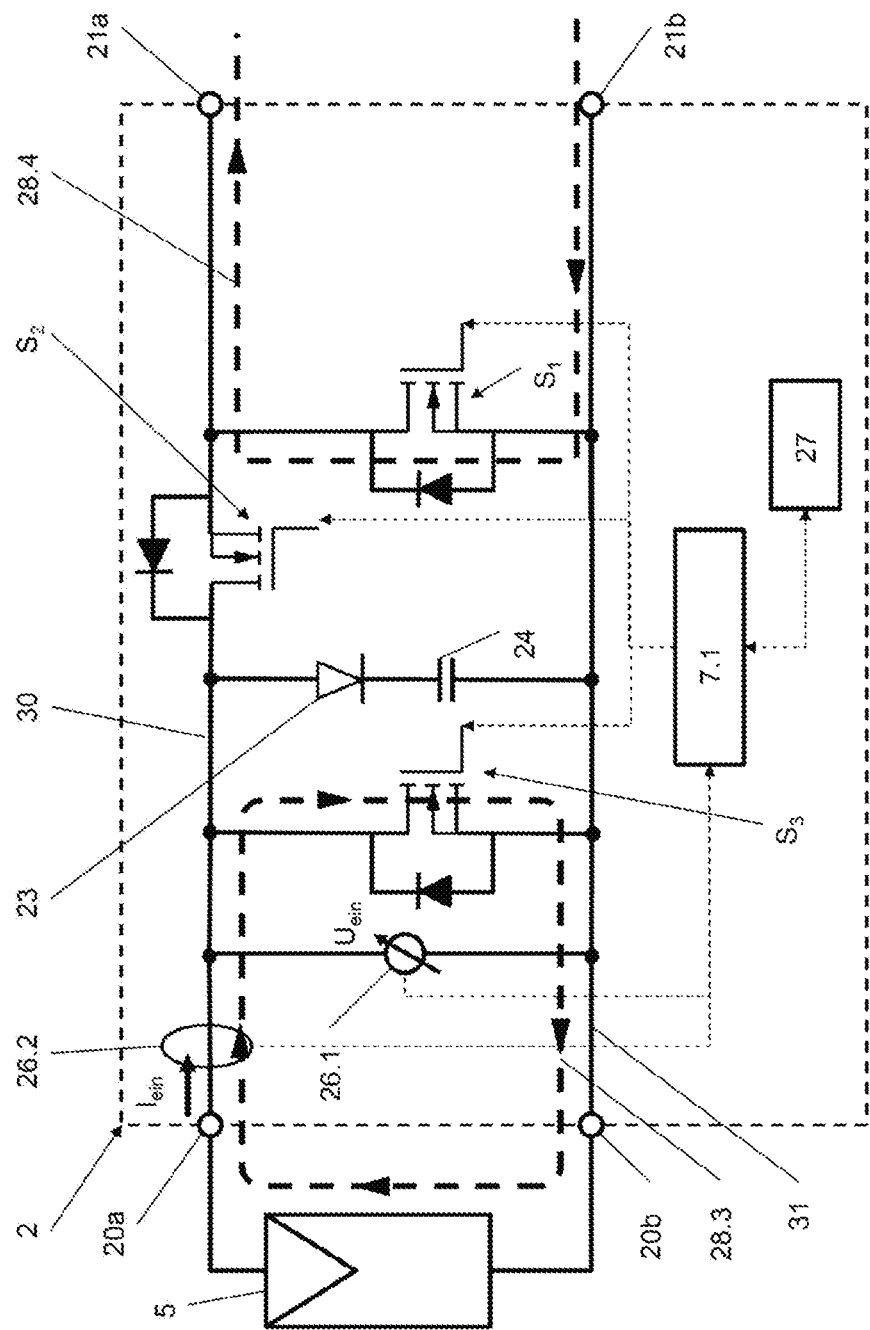
FIG. 3b shows a second embodiment of a coupling circuit for a PV module for carrying out the method

FIG. 3b illustrates a second embodiment of the coupling circuit 2, also here in the form of an enabling device of the assigned PV module 5. The second embodiment corresponds substantially to the first embodiment from FIG. 3a, which is why reference is made to the description there for the identical points and only the differences with respect to the first embodiment are explained below.

In addition to the first embodiment, the coupling circuit 2 according to FIG. 3b has a third switch $S_3$—likewise in the form of a MOSFET—in parallel with the input of the coupling circuit 2. The third switch $S_3$ can also be controlled via the control circuit 7.1. In this case, the coupling circuit 2 is designed to disconnect the PV module 5 assigned to it from the adjacent PV modules 5 in the string 6 by opening the second switch $S_2$. In this case, the first switch $S_1$ can be additionally closed. In this case, the current of the adjacent PV modules 5 flows past the PV module 5 of the coupling circuit 2, which is connected on the input side, via the closed first switch $S_1$, which is illustrated using the current path 28.4 in FIG. 3b. In this state—that is to say when the first switch $S_1$ is closed and when the second switch $S_2$ is open—and therefore virtually when the PV module 5 assigned to the coupling circuit 2 is disconnected—the control circuit 7.1 is able to change the PV module 5 to an operating mode close to short circuit (illustrated using the current path 28.3) when the third switch $S_3$ is closed and to change it to an operating mode close to open circuit when the third switch $S_3$ is open. The control circuit 7.1 is set up to determine a second current value $I_{SC,2}$ and a second voltage value $U_{0,2}$ in the respective operating modes and to transmit them, as measurement and operating parameters, to the superordinate controller 7 via the connected communication circuit 27.

Figure 4A:
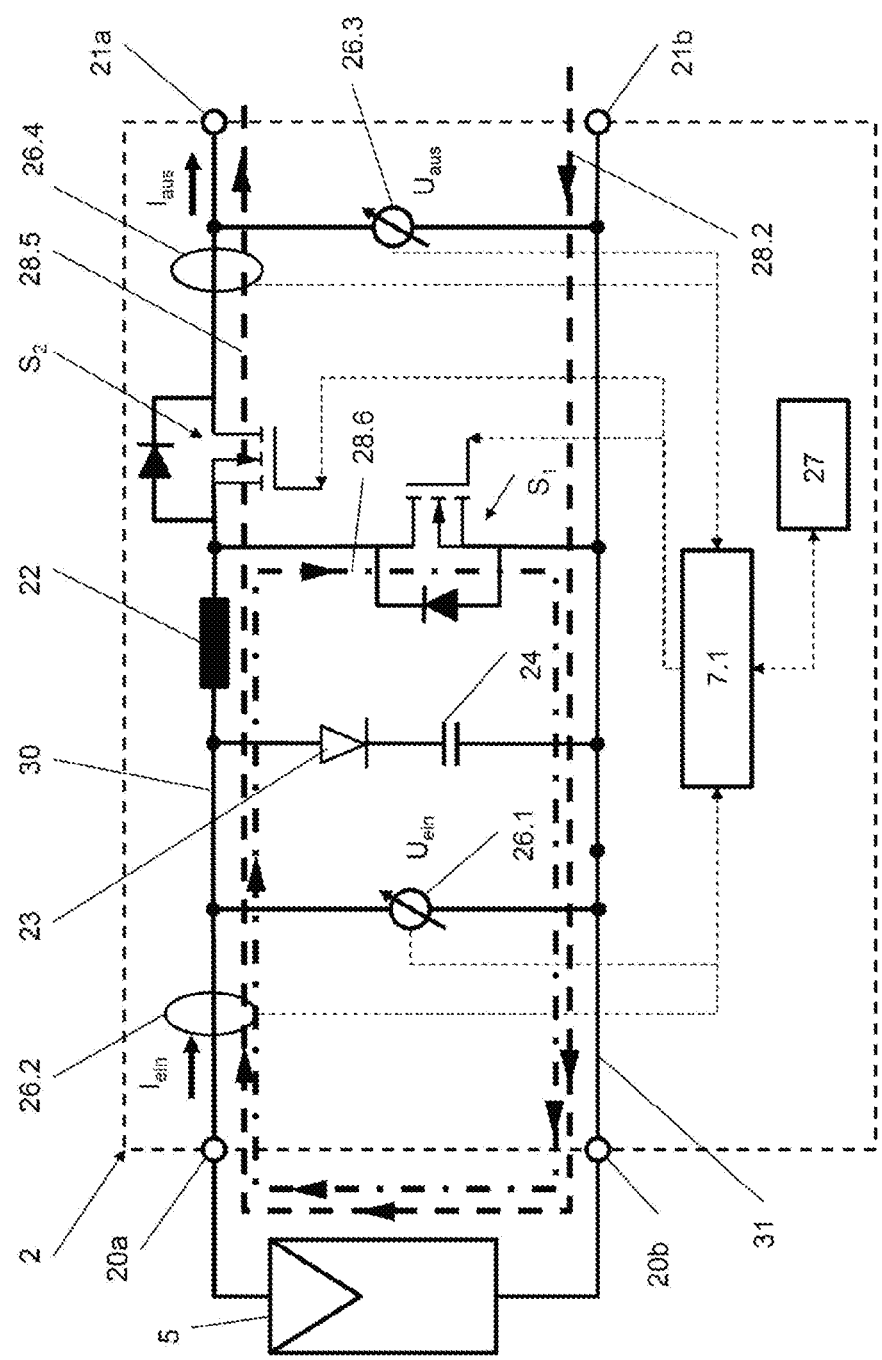
FIG. 4a shows a third embodiment of a coupling circuit for a PV module for carrying out the method

FIG. 4a illustrates a third embodiment of the coupling circuit 2 in the form of a DC/DC converter, in particular a boost converter. In some aspects, the third embodiment also resembles the embodiment according to FIG. 3a, which is why reference is likewise made in this respect to the description there. The differences with respect to the embodiment according to FIG. 3a are mainly explained below.

According to FIG. 4a, the coupling circuit has an inductance 22 inside the connecting line 30 and in series with the second switch $S_2$ arranged there. The first switch $S_1$ is arranged between the connecting lines 30, 31 and there connects one connecting line 31 to a centre point of the series circuit comprising the inductance 22 and the second switch $S_2$ inside the other connecting line 30. The coupling circuit 2 also has a further current sensor 26.4 for detecting an output current $I_{aus}$ and a further voltage sensor 26.3 for detecting an output voltage $U_{aus}$. The further current sensor 26.4 and the further voltage sensor 26.3 are operationally connected to the control circuit 7.1. The control circuit 7.1 is designed to clock the first switch $S_1$ and the second switch $S_2$ in such a manner that an input voltage $U_{ein}$ applied to the input connections 20a, 20b is converted into an output voltage $U_{aus}$ applied to the output connections 21a, 21b, with $U_{ein} < U_{aus}$ and a predefined conversion ratio $U_{aus}/U_{ein}$. The resulting current paths 28.5, 28.6 when the first switch $S_1$ is open (28.5) and when the first switch $S_1$ is closed (28.6) are outlined in differently dashed form inside the coupling circuit 2.

On account of the design as a boost converter, the coupling circuit 2 is able to change the PV module 5 connected on the input side, at least briefly, to an operating mode close to short circuit in a manner mostly independent of the adjacently connected PV modules 5 in the string 6. This is the case, for example, when the first switch $S_1$ is predominantly closed over time. Via the current sensor 26.2, the control circuit 7.1 is able to determine the second current value $I_{SC,2}$ indicating the operating mode close to short circuit.

Figure 4B:
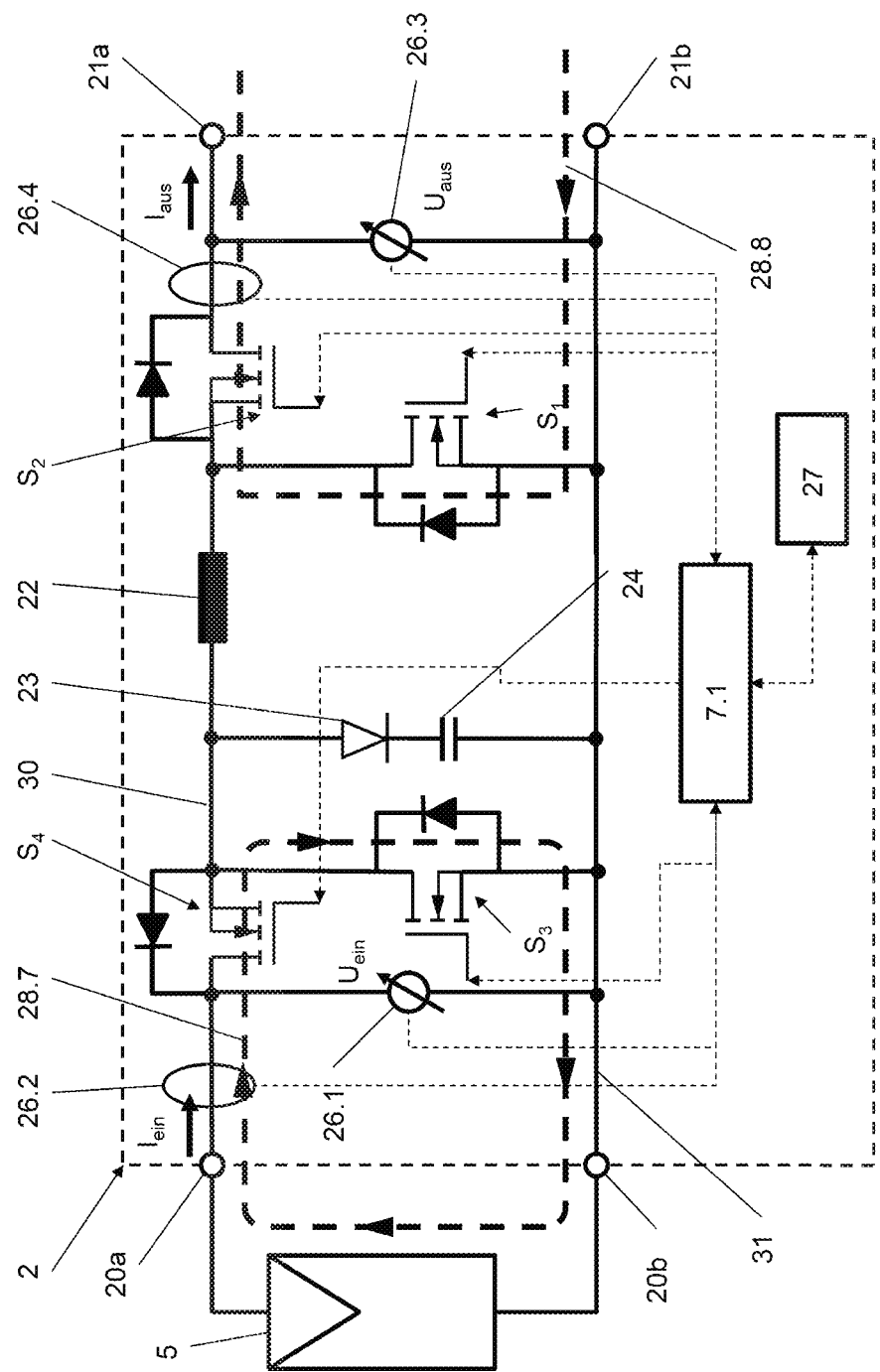
FIG. 4b shows a fourth embodiment of a coupling circuit for a PV module for carrying out the method.

FIG. 4b illustrates a fourth embodiment of the coupling circuit 2 in the form of a combined boost/buck converter as a DC/DC converter. In addition to the third embodiment according to FIG. 4a, the fourth embodiment according to FIG. 4b has further switches, namely a third switch $S_3$ and a fourth switch $S_4$. The fourth switch $S_4$ is connected in series with the inductance 22 and the second switch $S_2$ inside the connecting line 30 and is arranged between the first input connection 20a and the inductance 22. The third switch $S_3$ connects one connecting line 30 to the other connecting line 31, wherein a connection of the third switch $S_3$ to one connecting line 30 is arranged between the fourth switch $S_4$ and the inductance 22. Both the third switch $S_3$ and the fourth switch $S_4$ can be controlled via the control circuit 7.1.

As a combined boost/buck converter, the coupling circuit 2 is designed to convert an input voltage $U_{ein}$ applied to the input connections 20a, 20b into an output voltage $U_{aus}$ applied to the output connections 21a, 21b. In this case, the output voltage $U_{aus}$ may be greater, i.e. $U_{aus} > U_{ein}$, or else less than the input voltage, i.e. $U_{aus} < U_{ein}$. By appropriately controlling the switches S1 to S4, the control circuit 7.1 can both briefly and permanently cause an operating mode close to short circuit of the PV module 5 and can determine the second current value $I_{SC,2}$ indicating this operating mode via the current sensor 26.2. A current path 28.7 indicating the operating mode close to short circuit is schematically illustrated inside the coupling circuit 2. By accordingly differently controlling the switches S1 to S4, the control circuit 7.1 can both briefly and permanently cause an operating mode close to open circuit of the PV module 5 and, in this mode, can then determine the second voltage value $U_{0,2}$ indicating the operating mode close to open circuit via the voltage sensor 26.1. In this case, a current flowing in the string 6 and driven through the adjacent PV modules is guided past the PV module 5 assigned to the coupling circuit 2 via the output connections 21a, 21b, which is illustrated by the current path 28.8. These values can be transmitted as measurement and operating data to a superordinate controller 7 via the communication circuit 27.

The invention claimed is:

1. A method for determining a currently maximum possible power of a photovoltaic (PV) installation operated in a curtailed manner and comprising a PV generator having at least one string, wherein the at least one string comprises a series circuit of PV modules, in which at least one PV module is connected to adjacent PV modules in the string via a coupling circuit, the installation further including an inverter which is connected, on the output side, to an energy supply grid and is connected, on the input side, to the PV generator, a controller for controlling the inverter and the coupling circuit, wherein the controller, in conjunction with the coupling circuit, is configured to vary a power drain of the PV module assigned to it relative to a power drain of the adjacent PV modules during operation of the PV installation, comprising:
determining reference values for the PV module assigned to the coupling circuit, comprising a reference MPP power and at least one value from a reference current close to short circuit and/or a reference voltage close to open circuit, that is assigned to the reference MPP power,
operating the PV installation, in response to a curtailment signal, in a curtailed state with a lower power than the currently maximum possible power of the PV installation,
for the PV module assigned to the coupling circuit in the curtailed state of the PV installation:
determining a second current value indicating an operating mode close to short circuit, and/or
determining a second voltage value indicating an operating mode close to open circuit, and
determining a currently maximum possible power in the curtailed state of the PV installation, using:
the second current value, the reference current close to short circuit, and the reference MPP power, or the second voltage value, the reference voltage close to open circuit and the reference MPP power, or
a combination of the second current value, the reference current close to short circuit, the second voltage value, the reference voltage close to open circuit and the reference MPP power.

2. The method according to claim 1, wherein a current of the adjacent PV modules in the series circuit of PV modules is guided past the PV module that is assigned to the coupling circuit via a bypass path of the coupling circuit when determining the reference voltage close to open circuit and/or the second voltage value.

3. The method according to claim 1, wherein the reference values are generated using a characteristic curve sweep of a current/voltage characteristic curve of the PV module assigned to the coupling circuit or by sequentially, at least briefly changing the PV module assigned to the coupling circuit to the corresponding operating modes comprising the operating mode close to short circuit, the operating mode close to open circuit and an MPP operating mode.

4. The method according to claim 1,
wherein for the PV module assigned to the coupling circuit in the curtailed state of the PV installation, second current values indicating the operating mode close to short circuit and/or second voltage values indicating the operating mode close to open circuit are determined repeatedly and at successive times, and
wherein the currently maximum possible power in the curtailed state of the PV installation is determined from the respectively last determined variables comprising the second current value and/or the second voltage value and the reference values comprising the reference MPP power, the reference current close to short circuit and/or the reference voltage close to open circuit.

5. The method according to claim 1, wherein PV modules in the string which are not assigned a coupling circuit are operated in a curtailed manner in the open-circuit direction in the curtailed state of the PV installation.

6. The method according to claim 1, wherein the PV installation is also operated at maximum power when determining the reference values for the PV module assigned to the coupling circuit.

7. The method according to claim 1, wherein the reference values for the PV module assigned to the coupling circuit are determined with activated MPP tracking of the string and therefore with a change in a voltage of the string.

8. The method according to claim 1, wherein the PV module assigned to the coupling circuit is changed to the operating mode close to short circuit and/or to the operating mode close to open circuit with deactivated MPP tracking of the string and therefore without a change in the voltage of the string.

9. The method according to claim 1, wherein the PV module assigned to the coupling circuit is permanently operated in the respective operating mode comprising the operating mode close to short circuit and the operating mode close to open circuit when determining the second current value or the second voltage value.

10. The method according to claim 1, wherein at least one switch arranged in series with a connecting line of the coupling circuit is open when determining the second current value and/or the second voltage value.

11. A photovoltaic (PV) installation, comprising:
a photovoltaic (PV) generator having at least one string, wherein the at least one string comprises a series circuit of PV modules, in which at least one PV module is connected to adjacent PV modules in the string via a coupling circuit, an inverter connected, on an input side thereof, to the PV generator and connected, on an output side thereof, to an energy supply grid, a controller configured to control the inverter and the coupling circuit, wherein the controller is configured to:
- determine reference values for the PV module assigned to the coupling circuit, comprising a reference MPP power and at least one value from a reference current close to short circuit and/or a reference voltage close to open circuit, that is assigned to the reference MPP power,
- operate the PV installation, in response to a curtailment signal, in a curtailed state with a lower power than a currently maximum possible power of the PV installation,
- for the PV module assigned to the coupling circuit in the curtailed state of the PV installation:
  - determine a second current value indicating an operating mode close to short circuit, and/or
  - determine a second voltage value indicating an operating mode close to open circuit, and
  - determine a currently maximum possible power in the curtailed state of the PV installation, using:
    - the second current value, the reference current close to short circuit, and the reference MPP power, or
    - the second voltage value, the reference voltage close to open circuit and the reference MPP power, or
    - a combination of the second current value, the reference current close to short circuit, the second voltage value, the reference voltage close to open circuit and the reference MPP power.

12. The PV installation according to claim 11, wherein the coupling circuit comprises:
- two input connections configured to connect the PV module assigned to the coupling circuit,
- two output connections electrically connected to the input connections via connecting lines and configured to connect to the series circuit of PV modules, and
- a current sensor configured to detect an input current and/or a voltage sensor configured to detect an input voltage.

13. The PV installation according to claim 12, wherein the coupling circuit comprises:
- at least one switch coupled between the connecting lines, and controlled via the controller, and configured to short-circuit the PV module connected to the coupling circuit, and/or
- at least one switch coupled in series with one of the connecting lines and controlled via the controller, and configured to selectively open circuit the one of the connecting lines.

14. The PV installation according to claim 11, wherein the coupling circuit comprises a DC/DC converter.

15. The PV installation according to claim 11, wherein the coupling circuit comprises a communication circuit.

* * * * *